(No Model.)
G. W. WHITE.
FIRE CLAY HEATER.
No. 398,919. Patented Mar. 5, 1889.
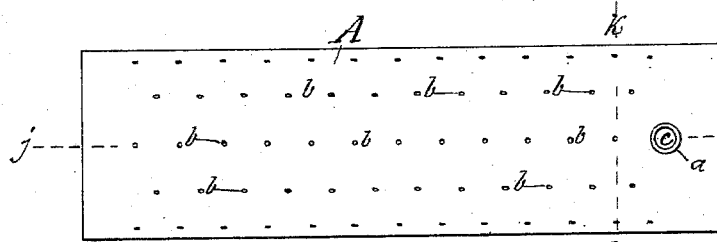
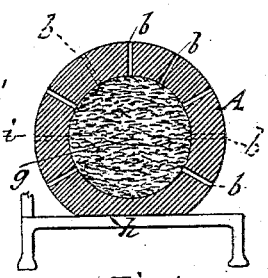
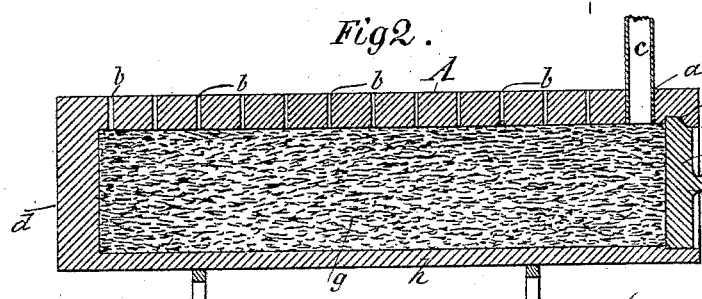
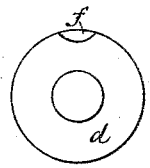
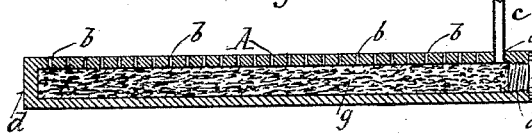
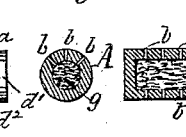
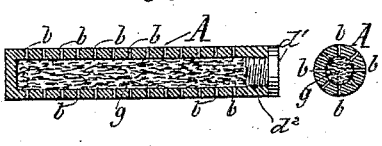
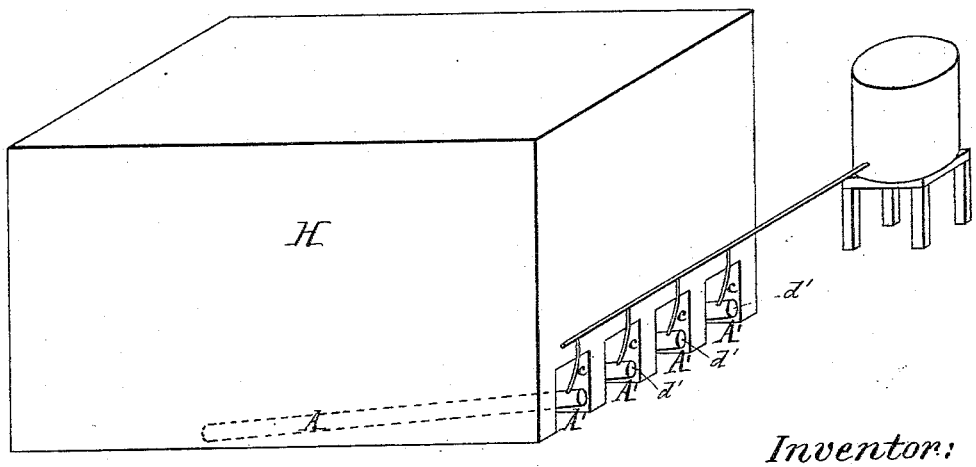
Witnesses:
J. P. Theo. Lang.
E. J. Fenwick.
Inventor:
George W. White
by his attys
Mason, Fenwick and Lawrence

UNITED STATES PATENT OFFICE.

GEORGE W. WHITE, OF WACO, ASSIGNOR TO THE TEXAS FIRE-CLAY MANUFACTURING COMPANY, OF FORT WORTH, TEXAS.

FIRE-CLAY HEATER.

SPECIFICATION forming part of Letters Patent No. 398,919, dated March 5, 1889.

Application filed June 26, 1888. Serial No. 278,295. (No model.)

*To all whom it may concern:*

Be it known that I, GEORGE W. WHITE, a citizen of the United States, residing at Waco, in the county of McLennan and State of Texas, have invented a Fire-Clay Heater, being a certain new and useful invention for the purpose of burning brick in kilns for heating steam-boilers, stoves, grates, and fire-places; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention consists in an improved fire-log burner for oil or other fluid or gaseous inflammable substances, said burner being in form of a tube or hollow cylinder, and made of "fire-clay," and provided with numerous jet or burner passages in its periphery, and filled with comminuted asbestos or other analogous absorbent or capillary fluid-conducting fire-proof material, as will be hereinafter described and specifically claimed.

The object of my invention is to provide a practically-operating and fire-proof fire-log for heating steam-boilers, stoves, grates, fire-places, and for other analogous uses.

In the drawings, Figure 1 represents my invention in elevation. Fig. 2 is a vertical section in the line *i j* of Fig. 1, the log being shown resting on andirons. Fig. 3 is a cross-section in the line *k l* of Fig. 1, the log being shown resting on andirons; and Fig. 4, a detail plan view of the removable cap or plug of the fire-log burner. Fig. 5 is a longitudinal section of a modification of the invention, showing a round fire-log burner with screw-plug cap and perforated partly around; and Fig. 6 is a cross-sectional view of the log. Fig. 7 is another modification of the fire-log burner perforated all around. Fig. 8 is a cross-sectional view of the same, and Fig. 9 is a perspective view illustrating the invention as applied to a brick-kiln.

A in the drawings indicates a perforated tube or hollow cylinder of any length and diameter desired, according to the purpose for which it is to be used, and it may be wholly or partly round or in any other desired shape. This cylinder or tube is made, preferably, with one closed solid end, $d$, and with a removable plug-like cap, $d'$, at the other end, so that access may be had to its interior. The cap $d'$ is provided with a fastening-recess, $f$, at its edge, and the cylinder is formed with a corresponding lug, $e$, which fits into said recess, as shown, and holds the cap in place. Instead of the cap $d'$, with its recess $f$, and the lug $e$ on the cylinder, a cap with a screw-thread, $d^2$, Figs. 5 and 7, may be adopted. The jet passages or perforations $b$ in the cylinder extend radially from the interior to the periphery of the cylinder and may be placed all around, as in Figs. 7 and 8, or partly around, as in Figs. 5 and 6, or all around, except at the bottom $h$, where the cylinder is flattened, so as to rest firmly upon the structure which supports it, as shown in Figs. 2 and 3. The size and number of the passages will be in proportion to the length and diameter of the cylinder and the purpose for which it is used. Near one end of the cylinder an induction or supply passage, $a$, is provided, and into the same is inserted a supply-tube, $c$, from an oil-tank or other source from which any suitable inflammable substance is derived for heating purposes. Through the plug-closed end of the cylinder asbestos or other fluid-absorbent fire-proof material in a comminuted form, as small fibrous pieces, is placed in the chamber of the cylinder, so as to fill the same, as indicated at $g$. The asbestos will not be so tightly packed as to prevent the flow of the fluid by capillary attraction through and between the particles from the supply-passage to the jet passages or perforations; but its particles should be close enough together to prevent a too rapid flow of the fluid and effect its distribution in very minute streams at the jet-passages. The asbestos itself, being non-combustible, will answer well as an enduring medium for securing a proper and regular supply of oil to the jet-passages; and the fire-clay of which the cylinder is constructed, being capable of withstanding the great heat to which it is subjected, not burning out like metal and not liable to corrosion, it, in combination with the asbestos, will form a very cheap and desirable fluid-burner log.

The within-described cylindrical or tubular fluid-burner log may be used singly or in any number desired. For burning brick or heating boilers they can be placed in the combustion chamber or chambers of any common kiln, H, as illustrated in Fig. 9, or any furnace, they extending nearly or quite the entire length of the chamber, and projecting at one end, A', four or six inches outside the wall or casing, so as to be kept cool at the point where the supply-tube c is introduced. The casing or wall around the log should of course be air-tight.

These logs can be used in the same way for steam-boilers or heating-flues, and when made smaller can be used in the same way for stoves, grates, and fire-places. If desired, the log can be soaked in a vat and placed in a stove or fire-place, in which case no supply through the pipe c will be necessary.

What I claim as my invention is—

The fluid-burner fire-log formed of fire-clay in cylindrical or tubular form, and provided with an oil-supply passage, jet-burner passages in its periphery, a filling opening, and cap at one end, said tubular log filled with asbestus, substantially as and for the purpose described.

G. W. WHITE.

Witnesses:
E. A. STURGIS, Jr.,
W. H. CAMERON.